United States Patent [19]

Yorozu et al.

[11] Patent Number: 5,451,178

[45] Date of Patent: Sep. 19, 1995

[54] AUDITORY PLAYING DEVICE

[75] Inventors: Hiromu Yorozu; Emi Hattori, both of Kanagawa; Nae Yasuhara, Tokyo, all of Japan

[73] Assignee: Sony Corporation, Japan

[21] Appl. No.: 26,484

[22] Filed: Mar. 4, 1993

[30] Foreign Application Priority Data

| Mar. 26, 1992 | [JP] | Japan | 4-068479 |
| Mar. 27, 1992 | [JP] | Japan | 4-071530 |
| Jan. 5, 1993 | [JP] | Japan | 5-000296 |

[51] Int. Cl.⁶ .................................................. A63H 5/00
[52] U.S. Cl. ........................................ 446/175; 446/397; 434/311; 395/2.81; 84/600
[58] Field of Search ............... 446/175, 397, 408; 434/309, 308, 311, 312; 395/2.81; 381/52; 360/12; 84/97, 600, 639

[56] References Cited

U.S. PATENT DOCUMENTS

| 577,839 | 3/1897 | Cuendet et al. | 84/97 |
| 2,014,741 | 9/1935 | Lesti | 84/639 |
| 2,487,413 | 11/1949 | Barnum | 84/97 |
| 3,214,507 | 10/1965 | Williams | 84/639 |
| 3,643,068 | 2/1972 | Mohan et al. | 235/464 |
| 3,647,927 | 3/1972 | Chang et al. | 84/639 |
| 3,757,090 | 9/1973 | Haefeli et al. | 235/464 |
| 3,871,112 | 3/1975 | Licitis | 446/397 |
| 3,916,160 | 10/1975 | Russo et al. | 235/464 |
| 4,245,404 | 1/1981 | Yoshinari | 434/312 |
| 4,333,258 | 1/1982 | McCaslin | 446/481 |
| 4,549,867 | 10/1985 | Dittakavi | 381/52 |
| 4,602,152 | 7/1986 | Dittakavi | 381/52 |
| 4,729,564 | 3/1988 | Kuna | 434/311 |
| 4,820,233 | 4/1989 | Weiner | 446/397 |
| 5,059,126 | 10/1991 | Kimball | 434/308 |
| 5,127,869 | 7/1992 | Hanzawa | 446/397 |
| 5,145,447 | 9/1992 | Goldfarb | 446/397 |

FOREIGN PATENT DOCUMENTS

| 405057063 | 3/1993 | Japan | 446/397 |
| 2149557 | 6/1985 | United Kingdom | 434/311 |
| 2218562 | 11/1989 | United Kingdom | 434/308 |

OTHER PUBLICATIONS

"What's New in Electronics", Popular Science, Mar. 1977, p. 100.

*Primary Examiner*—Robert A. Hafer
*Assistant Examiner*—Jeffrey D. Carlson
*Attorney, Agent, or Firm*—Ronald P. Kananen

[57] ABSTRACT

An auditory playing device has a plurality of circular or polygonal tone plates marked with respective identification codes. Each of the tone plates has concentric dark and bright stripes that are placed, one at a time, in a recess defined in a casing substantially in any direction with respect to the recess. The casing houses an array of detectors disposed in the recess for detecting the identification code on the tone plate that is placed in the recess. A microcomputer determines whether a tone plate is placed in the recess based on signals from the detectors. When one of the tone plates is placed in the recess, the microcomputer controls a loudspeaker to produce a sound represented by the identification code on the tone plate placed in the recess. The auditory playing device can easily be handled by children and is effective to train them for sharpening their auditory senses.

17 Claims, 18 Drawing Sheets

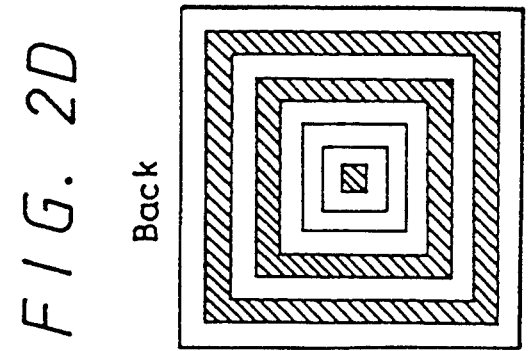
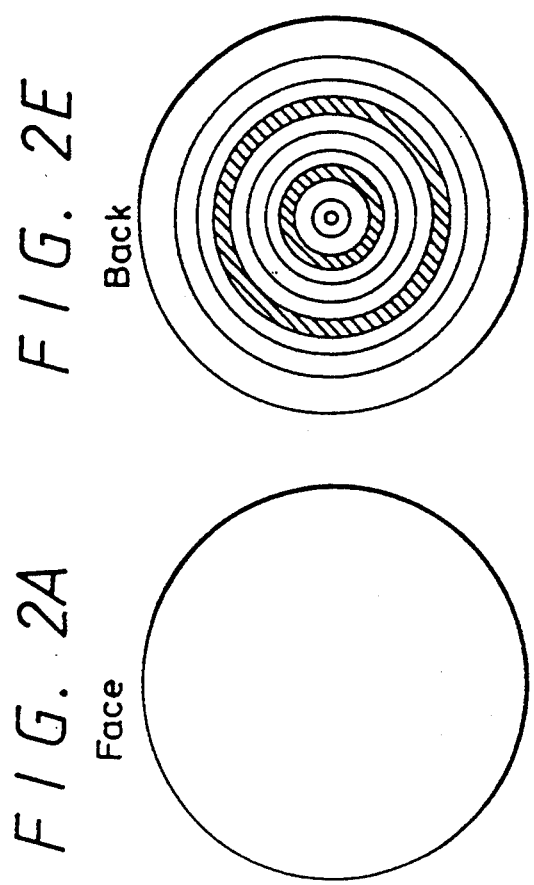
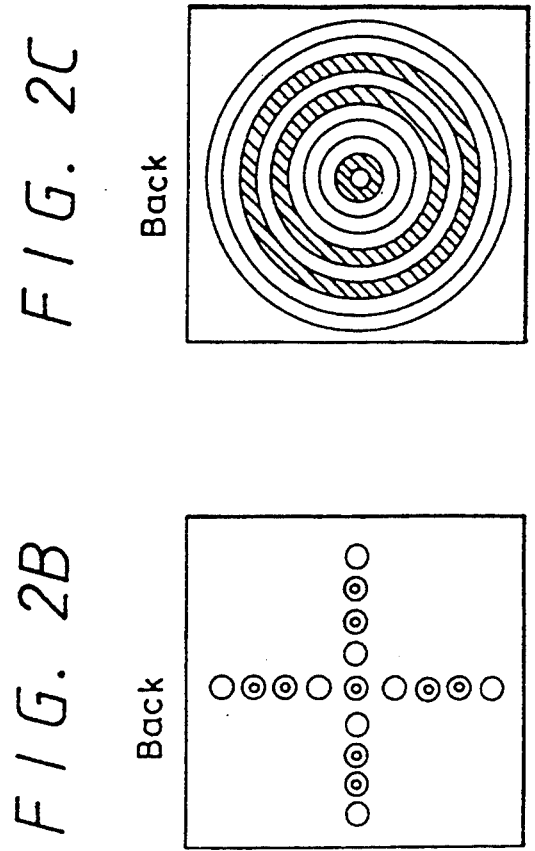

F I G. 11A
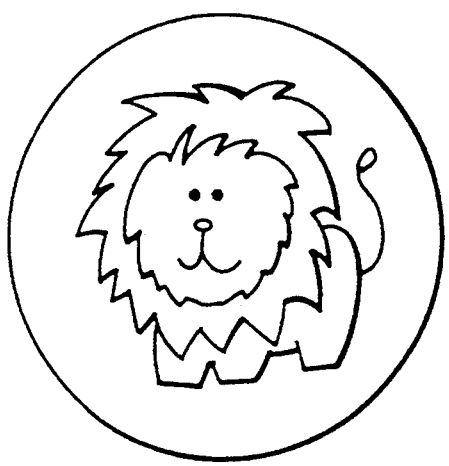
F I G. 11B
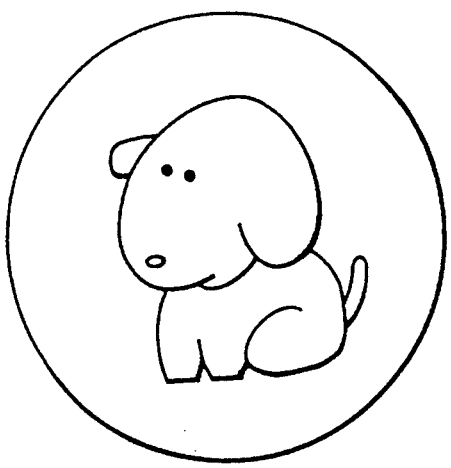
F I G. 11C
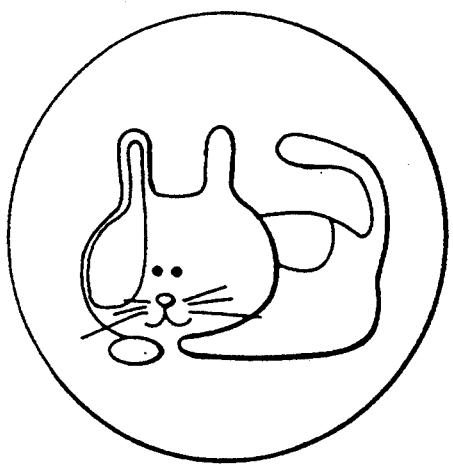
F I G. 11D
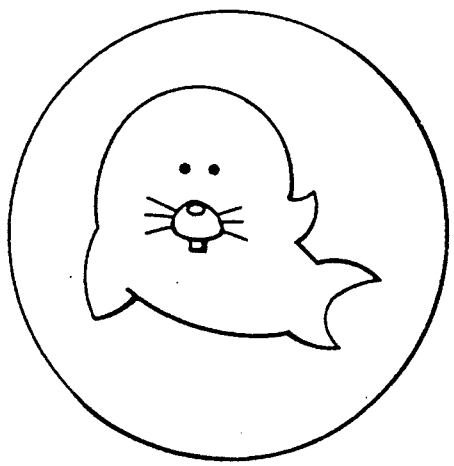

AUDITORY PLAYING DEVICE

BACKGROUND OF THE INVENTION

1. Field of the Invention

The present invention relates to an auditory playing device for use in auditory education or as a toy.

2. Description of the Prior Art

For auditory education to teach children absolute pitches, for example, it has been customary to let them hear sounds of a tuned piano so that they can memorize the tones. However, it is difficult with this method to keep the children interested in the training even if some game-like element such as guessing of tones is added. The method is therefore not an effective education process.

It is known that the younger the children who are given auditory education for absolute pitches, for example, the more effective the education process becomes.

In view of the advantages in the early auditory education, the applicant has proposed, in Japanese patent application No. 3-220714, an auditory playing device which is designed to effectively train children for sharpening auditory senses through playing with a toy. The proposed auditory playing device has an electric circuit connected to a loudspeaker for reproducing and radiating sounds of different tones or voice sounds, and a plurality of tone plates which can selectively be placed, one at a time, in a recess defined in a casing. When one of the tone plates is inserted in the recess, the electric circuit enables the loudspeaker to reproduce and radiate a tone or voice which is indicated by the inserted tone plate.

The proposed auditory playing device is highly effective to train children for auditory education because it operates like a game, keeping the children interested in playing with the device. However, since a selected one of the tone plates has to be accurately positioned with respect to the recess when it is inserted into the recess, the tone plates are required to be specially shaped or marked with a directional picture on their upper surface such that they will be oriented in one way with respect to the recess. The specially shaped or marked tone plates are disadvantageous in that they are limited to a certain shape and may be useless especially with younger children.

OBJECTS AND SUMMARY OF THE INVENTION

It is therefore an object of the present invention to provide an auditory playing device which can easily be used by younger children and is still effective in training children for auditory education.

According to the present invention, there is provided an auditory playing device comprising a tone plate marked with a concentric identification code corresponding to a sound, means for defining a recess for placing the tone plate therein substantially in any orientation with respect thereto, detecting means disposed in the recess for detecting the identification code of the tone plate which is placed in the recess, and generating means for generating the sound corresponding to the identification code detected by the detecting means.

The auditory playing device may have a plurality of tone plates marked with a plurality of respective concentric identification codes corresponding to respective sounds. The concentric identification codes are attached to backs of the tone plates, respectively, the tone plates being marked on faces thereof with respective pictures corresponding to the concentric identification codes. The auditory playing device may have a plurality of groups of tone plates marked with a plurality of groups of respective concentric identification codes corresponding to respective sounds. The tone plate may be of a circular shape with the identification code thereof being arranged from a center to an outer circumferential edge thereof, or a polygonal shape with the identification code thereof being arranged from a center to all outer sides thereof.

The recess has an area facing each of the tone plate placed therein, the area being smaller than the tone plate so that when the tone plate is placed in the recess, a marginal edge of the tone plate projects out of the recess.

When one of the tone plates is placed in the recess, the generating means generates a sound represented by the identification code on the tone plate that is placed in the recess.

According to the present invention, there is also provided an auditory playing device comprising a tone plate marked with an identification code corresponding to a sound, the identification code comprising concentric dark and bright stripes, means for defining a recess for placing the tone plate therein substantially in any orientation with respect thereto, optical detecting means disposed in the recess for optically detecting the identification code of the tone plate which is placed in the recess, and generating means for generating the sound corresponding to the identification code detected by the optical detecting means.

The optical detecting means comprises an array of reflective detectors arranged across the identification code of the tone plate placed in the recess, each of the reflective detectors comprising a light-emitting device for applying light to the identification code and a photodetector for detecting light reflected by the identification code.

The auditory playing device further comprises control means for determining whether the tone plate is placed in the recess based on bits of the identification code detected by the optical detecting means, and energizing the generating means when the tone plate is determined as being placed in the recess.

The control means comprises means for determining that the tone plate is not placed in the recess when at least two of the bits of the identification code detected by the optical detecting means are of a pattern depending on extraneous light applied to the identification code.

Alternatively, the control means comprises means for determining that the tone plate is not placed in the recess when all of the bits of the identification code detected by the optical detecting means are of a pattern depending on extraneous light applied to the identification code.

The above and other objects, features, and advantages of the present invention will become apparent from the following description of illustrative embodiments thereof to be read in conjunction with the accompanying drawings, in which like reference numerals represent the same or similar objects.

BRIEF DESCRIPTION OF THE DRAWINGS

FIGS. 2A through 2E are plan views showing different identification codes on tone plates;

FIGS. 11A through 11D are views of pictures that may be used on tone plates in an animal mode;

DETAILED DESCRIPTION OF THE PREFERRED EMBODIMENTS

Figure 1:
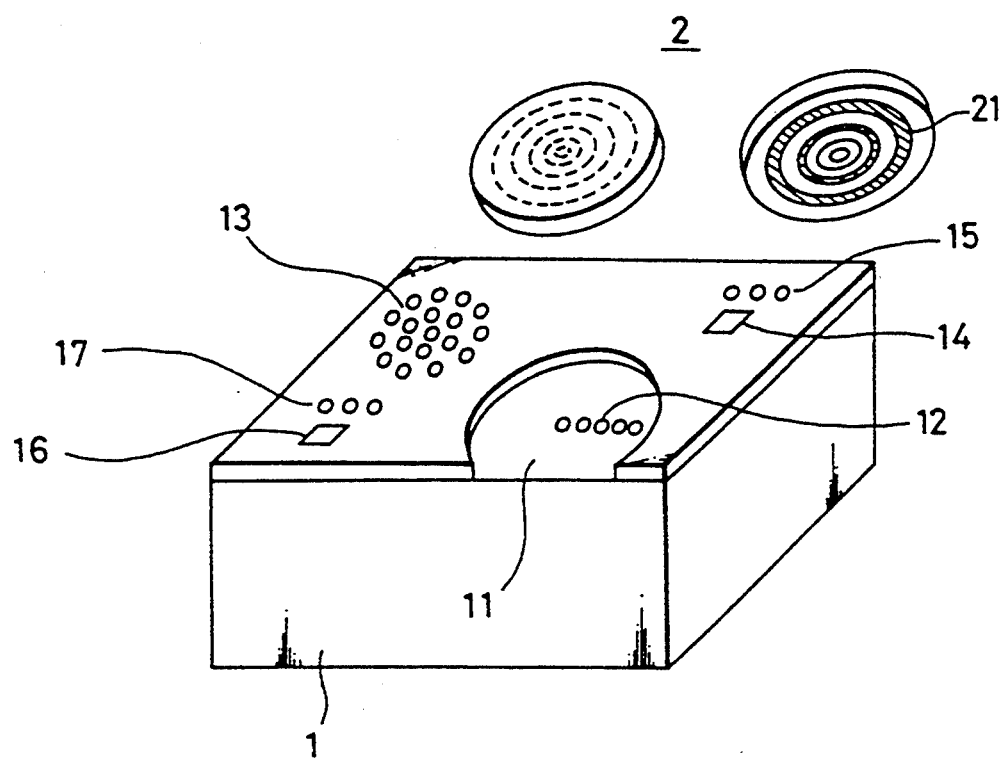
FIG. 1 is a perspective view of an auditory playing device according to an embodiment of the present invention.

As shown in FIG. 1, an auditory playing device according to an embodiment of the present invention comprises a casing 1 accommodating an electric circuit (described later on). The casing 1 has a substantially circular recess 11 defined in its upper panel and a detector device 12 disposed on the bottom of the recess 11. The auditory playing device also has a plurality of tone plates 2 which can selectively be placed, one at a time, in the recess 11 in any desired orientation with respect to the recess 11, each of the tone plates 2 having a concentric identification code 21 recorded thereon. The identification code 21 on each of the tone plates 2 can be detected by the detector device 12 when the tone plate 2 is placed in the recess 11. The casing 1 also houses therein a loudspeaker 13 mounted on the upper panel for generating a sound of a tone or a voice sound corresponding to the identification code 21 that is detected by the detector device 12. The casing 1 supports a sound-intensity adjusting switch 14 for adjusting the intensity of the sound that is radiated by the loudspeaker 13, an indicator 15 such as three LEDs, for example, for indicating the intensity of the sound adjusted by the switch 14, a sound-source-mode selecting switch 16 for selecting a sound source mode (described later on) to which the radiated sound belongs, and an indicator 17 such as three LEDs, for example, for indicating the sound source mode that is selected by the switch 16.

Each of the tone plates 2 is in the form of a disc with the identification code 21 being recorded on its back as concentric dark and bright circular stripes or rings arranged from the center to the outer circumferential edge of the tone plate 2, also as shown in FIGS. 2A and 2E.

FIGS. 2B through 2D show different identification codes on tone plates. Each of the tone plates shown in FIGS. 2B through 2D is of a square shape. The tone plate shown in FIG. 2B has on its back an identification code comprising concentric linear arrays of dark and bright dots arranged from the center toward the outer sides of the tone plate. The tone plate shown in FIG. 2C has on its back an identification code comprising concentric dark and light rings arranged from the center toward the outer sides of the tone plate. The tone plate shown in FIG. 2D has on its back an identification code comprising concentric dark and light square stripes arranged from the center toward all outer sides of the tone plate.

The illustrated circular and square shapes of the tone plates are illustrative only. They may be in the shape of a regular triangle, a rectangle, a pentagon, or any other polygon. Identification codes on polygonal tone plates comprise concentric stripes or dots arranged from the center toward all outer sides thereof. The circular or polygonal tone plates can be placed in the recess 11 in desired orientations with respect thereto.

When a tone plate 2 is put in the recess 11, the identification code 21 on the tone plate 2 is detected by the detector device 12, and the electric circuit in the casing 1 processes the detected identification code 21 and enables the loudspeaker 13 to produce and radiate a sound corresponding to the identification code 21.

Figure 3:
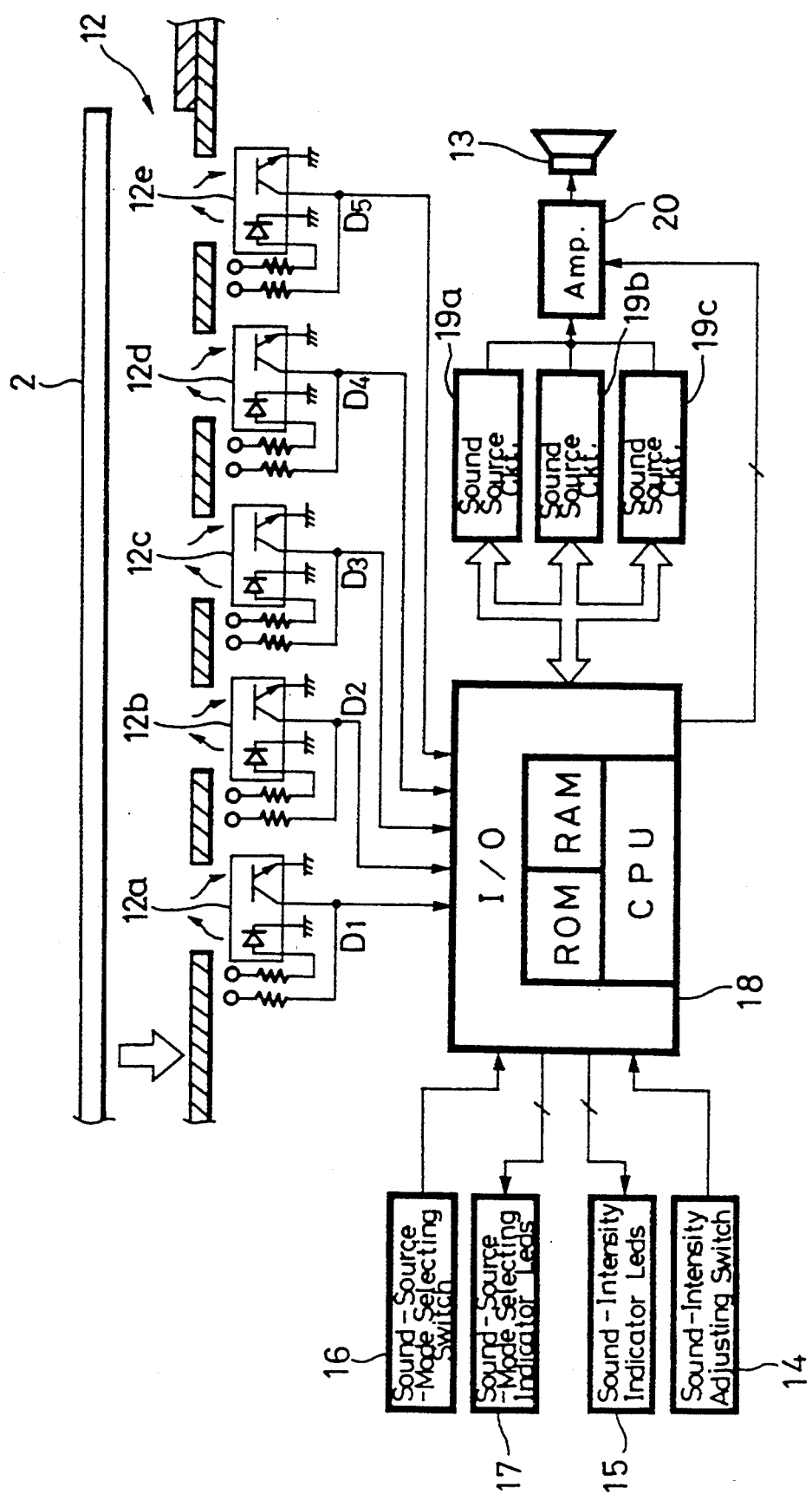
FIG. 3 is a block diagram of an electric circuit of the auditory playing device.

FIG. 3 shows in detail the electric circuit in the casing 1. As shown in FIG. 3, the detector device 12 is in the form of an optical detector for optically detecting the identification code 21. The detector device 12 comprises an array of five detectors 12a, 12b, 12c, 12d, 12e each comprising a reflective photodetector such as a phototransistor and a light-emitting device such as an LED, for example. The LED of each of the detectors 12a, 12b, 12c, 12d, 12e emits and applies light to the back of a tone plate 2 placed in the recess 11, and the phototransistor paired with the LED detects light reflected by the tone plate 2 and generates an electric signal representative of the detected light. The five detectors 12a, 12b, 12c, 12d, 12e are arranged radially in the recess 11 so that their array extends across the stripes of the identification code 21.

The detectors 12a, 12b, 12c, 12d, 12e generate and supply respective electric signals $D_1$, $D_2$, $D_3$, $D_4$, $D_5$ to a microcomputer 18. The microcomputer 18 comprises a CPU for controlling various components of the electric circuit, a ROM for storing an operating program executed by the CPU, a RAM for storing various variables in a work area, and an I/O circuit for transmitting signals from the CPU to the various components of the electric circuit and receiving signals from the various components of the electric circuit. The microcomputer 18 supplies control data to sound source circuits 19a, 19b, 19c, which supply signals, based on the control data, through an audio amplifier 20 to the loudspeaker 13 to enable it to radiate a sound.

Each of the sound source circuits 19a, 19b, 19c comprises a melody IC including a waveform ROM and a D/A converter for generating sounds and music pieces, e.g., cries of animals, music melodies, chords of musical instruments, familiar sounds, notes of C, D, E, F, etc., or the like. For example, the sound source circuit 19a generates a plurality of music melodies, the sound source circuit 19b generates notes of C, D, E, F, etc., and chords of musical instruments, and the sound source circuit 19c generates cries of animals and familiar sounds.

The microcomputer 18 is also supplied with signals from the sound-intensity adjusting switch 14 and the sound-source-mode selecting switch 16.

In response to a signal from the sound-intensity adjusting switch 14, the microcomputer 18 adjusts the gain of the audio amplifier 20 and supplies an indication signal to the indicator 15. When the sound-intensity adjusting switch 14 is continuously turned on, the three LEDs of the indicator 15 are successively energized to indicate lower, middle, and higher sound intensities. At the same time, the gain of the audio amplifier 20 is also successively set to three levels.

The microcomputer 18 selects one of the sound source circuits 19a, 19b, 19c, i.e., sound source modes, in response to a signal from the sound-source-mode selecting switch 16. The microcomputer 18 also supplies an indication signal to the indicator 17. When the sound-source-mode selecting switch 16 is continuously turned on, the three LEDs of the indicator 17 are successively energized to indicate the three sound source modes, and the sound source circuits 19a, 19b, 19c are also successively selected. The electric circuit may be arranged such that when the sound-source-mode selecting switch 16 is turned on, the loudspeaker 13 may produce sounds from different sound sources based on the same identification code.

In operation, when a desired one of the tone plates 2 is placed in the recess 11, the identification code 21 on the back of the tone plate 2 is detected by the detectors 12a~12e. Detected signals $D_1 \sim D_5$ generated by the detectors 12a are supplied to the microcomputer 18, which supplies signals to the sound source circuits 19a~19c to select a sound to be produced, such as a cry of an animal, a music melody, a chord of a musical instrument, a note, a familiar sound, or the like. A signal indicative of the selected sound is then supplied from one of the sound source circuits 19a~19c through the audio amplifier 20 to the loudspeaker 13, which radiates the selected sound at an adjusted level.

In this embodiment, because each of the tone plates 2 is circular or polygonal in shape, it can be placed in the recess 11 in almost any desired orientation with respect to the recess 11, and hence can easily be handled by younger children.

As shown in FIG. 1, the recess 11 has a smaller bottom area facing each of the tone plates 2 which is placed therein than each of the tone plates 2, i.e., the surrounding edge of the recess 1 is partly open at one side of the casing 1, so that when a tone plate 2 is placed in the recess 11, a circumferential marginal edge of the tone plate 2 projects laterally beyond the side of the casing 1. Consequently, by holding the projecting edge of the tone plate 2 placed in the recess 11, the player can easily lift the tone plate 2 out of the recess 11.

Figure 4:
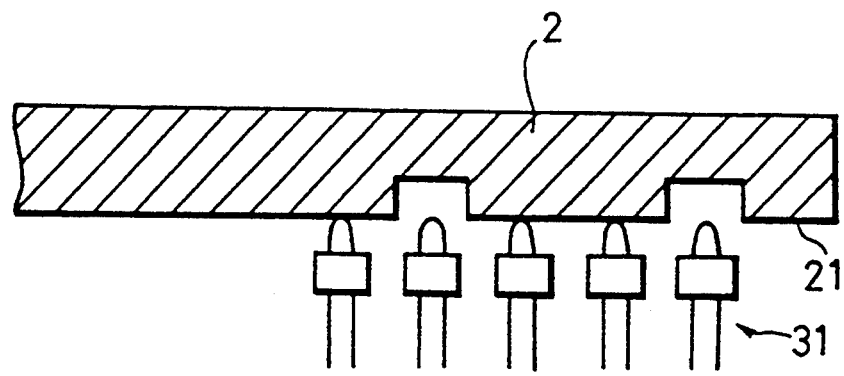
FIG. 4 is a cross-sectional view showing microswitches that can be as detectors in the auditory playing device.

As illustrated in FIG. 4, the identification code 21 of a tone plate 2 may comprise convex and concave surfaces, and the detector device may comprise an array of microswitches 31 for mechanically detecting the convex and concave surfaces.

Figure 5:
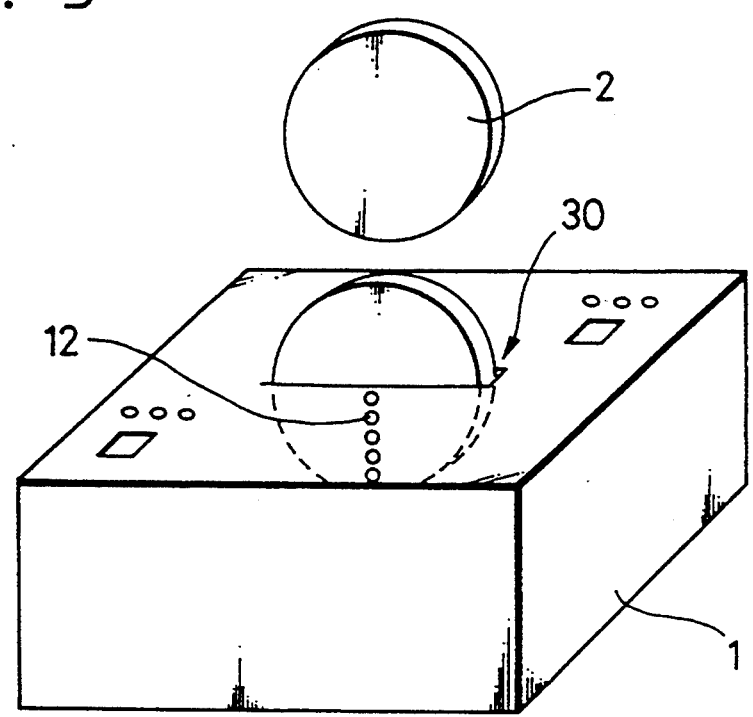
FIG. 5 is a perspective view of an auditory playing device according to another embodiment of the present invention.

FIG. 5 shows an auditory playing device according to another embodiment of the present invention. In FIG. 5, the auditory playing device comprises a casing 1 having a slot 30 defined in its upper panel, and a plurality of tone plates 2 (one shown) which can selectively be inserted vertically into the slot 30. The auditory playing device also has a detector device 12 disposed in the slot 30 for detecting the identification code on the tone plate 2 inserted in the slot 30.

Figure 6A:
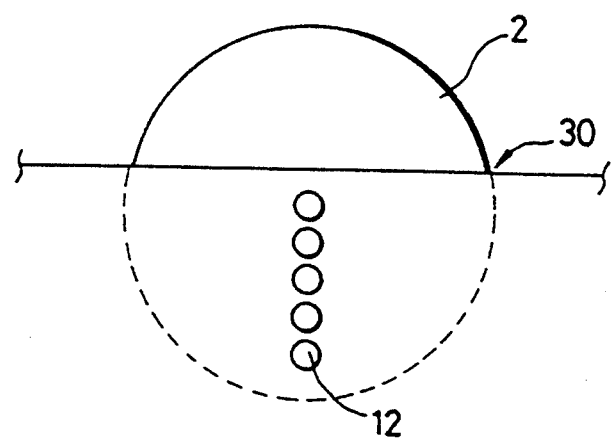
FIGS. 6A through 6C are views of differently directed arrays of detectors for use in the auditory playing device shown in FIG. 5.
Figure 6B:
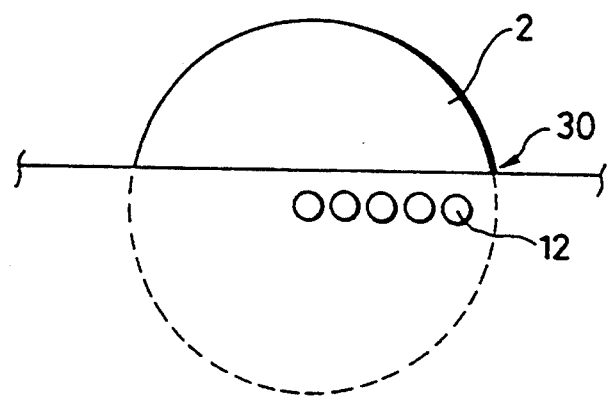
Figure 6C:
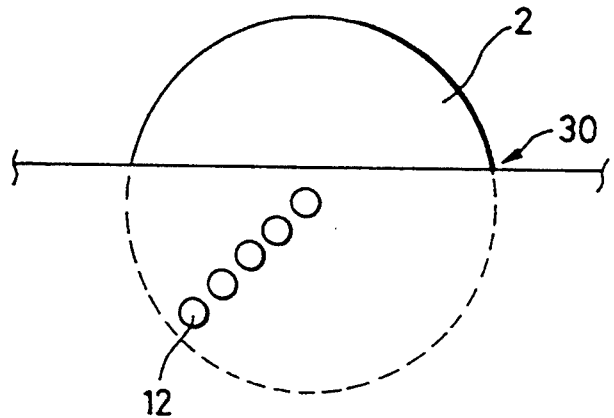

The detector device 12 comprises an array of detectors which may be arranged in various directions as shown in FIGS. 6A, 6B, and 6C. The detector device 12 can detect the identification code on a tone plate 2 that may be inserted in any direction in the slot 30. Each of the detectors may comprise a reflective photodetector such as shown in FIG. 3 or a microswitch such as shown in FIG. 4.

In the case where the detector device 12 comprises an array of photodetectors, the auditory playing device may malfunction on account of adverse optical conditions surrounding the auditory playing device. For example, when the auditory playing device is used outdoors, ambient light may be applied to all the photodetectors, which may all be turned on, and when the auditory playing device is used indoors, all the photodetectors may be turned off.

One solution would be to enable the detector device 12 only when a tone plate 2 is detected as being placed in the recess 11. A mechanical switch may be used to detect a tone plate 2 when it is placed in the recess 11. However, the casing and the switch would be required to be mechanically designed such that the switch would be turned on accurately and reliably upon placing the tone plate 2 in the recess 11. Furthermore, since the tone plates 2 are lightweight, they may fail to trigger the mechanical switch when placed in the recess 11.

The auditory playing device according to the present invention is arranged to prevent itself from malfunctioning when it is used outdoors and indoors.

More specifically, the microcomputer 18 shown in FIG. 3 determines whether there is a tone plate 2 placed in the recess 11 or not based on identification code bits detected by the detectors 12a~12e, and energizes the loudspeaker 13 if there is a tone plate 2 placed in the recess 11. Such identification code bits are represented by stripes or dots of the identification code 21. Specifically, if at least two of the identification code bits detected by the detectors 12a~12e are of a predetermined bit pattern depending on extraneous light applied to the identification code 21, then the microcomputer 18 determines that no tone plate is placed in the recess 11.

The identification code 21 is encoded such that at least two identification code bits, e.g., those corresponding to the detectors 12a, 12b, are bright and dark stripes or dots, i.e., "0" and "1" as detected by the detectors 12a, 12b.

Figure 7:
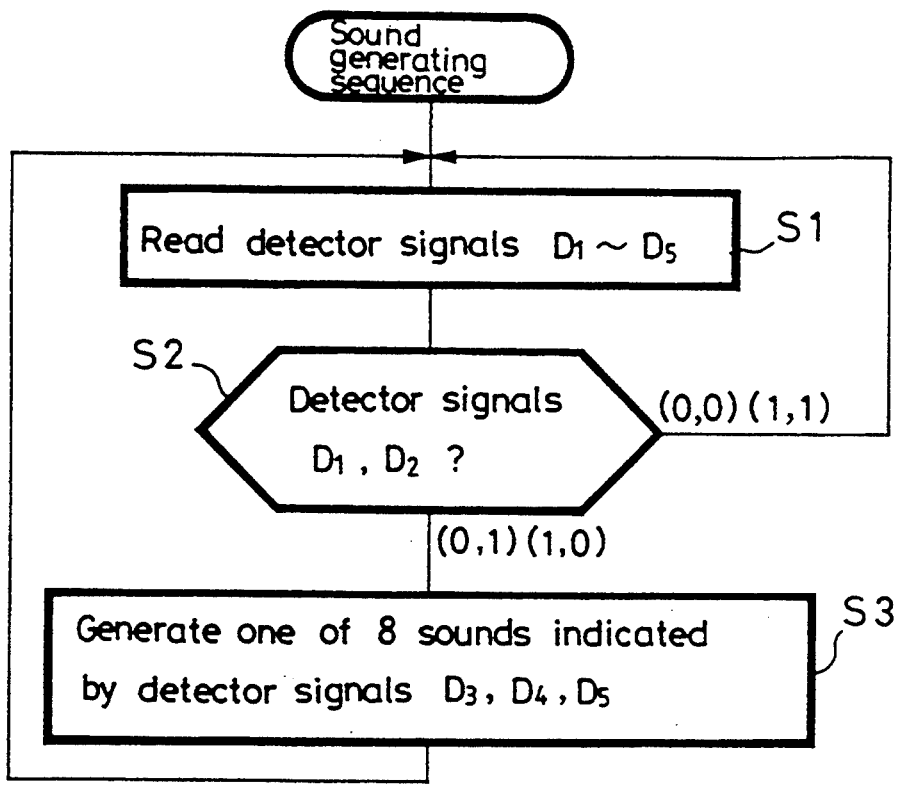
FIG. 7 is a flowchart of an operation sequence for detecting a tone plate with 2-bit output signals from the detectors.

When the identification code 21 is detected by the detector device 12, the microcomputer 18 processes the detected signal from the detector device 12 according to an operation sequence shown in FIG. 7.

First, the microcomputer 18 reads detected signals $D_1 \sim D_5$ from the respective detectors $12a \sim 12e$ in a step S1. Then, the microcomputer 18 determines whether there is a tone plate 2 in the recess 11 based on the signals $D_1$, $D_2$ from the respective detectors $12a$, $12b$ in a step S2. Specifically, since the two identification code bits which correspond to the detectors $12a$, $12b$ are bright and dark stripes or dots, as described above, if there is a tone plate 2 actually placed in the recess 11, then the signals $D_1$, $D_2$ from the respective detectors $12a$, $12b$ are "1 (=bright stripe), 0 (=dark stripe)" or "0, 1". If there is no tone plate placed in the recess 11 when the auditory playing device is used outdoors, then the signals $D_1$, $D_2$ from the respective detectors $12a$, $12b$ are "0, 0". Conversely, if there is no tone plate placed in the recess 11 when the auditory playing device is used indoors, then the signals $D_1$, $D_2$ from the respective detectors $12a$, $12b$ are "1, 1".

Therefore, if the signals $D_1$, $D_2$ from the respective detectors $12a$, $12b$ are "0, 0" or "1, 1" in the step S2, then the microcomputer 18 determines that no tone plate is placed in the recess 11, and control returns to the step S1.

If the signals $D_1$, $D_2$ from the respective detectors $12a$, $12b$ are "0, 1" or "1, 0" in the step S2, then the microcomputer 18 determines that a tone plate 2 is placed in the recess 11. Thereafter, control proceeds to a step S3 in which the microcomputer 18 generates control data to produce one of 8 (eight) sounds based on the signals $D_3$, $D_4$, $D_5$ produced by the detectors $12c$, $12d$, $12e$.

Therefore, the auditory playing device produces sounds only when the signals $D_1$, $D_2$ from the respective detectors $12a$, $12b$ are "0, 1" or "1, 0" in the step S2. The auditory playing device is prevented from malfunctioning, i.e., producing sounds when no tone plate is placed in the recess 11. The microcomputer 18 can thus detect accurately and reliably whether there is a tone plate placed in the recess 11 based on the signals $D_1 \sim D_5$ from the detectors $12a \sim 12e$.

According to another operation sequence, the microcomputer 18 may determine that no tone plate is placed in the recess 11 if all identification code bits represented by the signals $D_1 \sim D_5$ from the detectors $12a \sim 12e$ are of a certain bit pattern depending on extraneous light. Such an alternative operation sequence will be described below with reference to FIG. 8.

Figure 8:
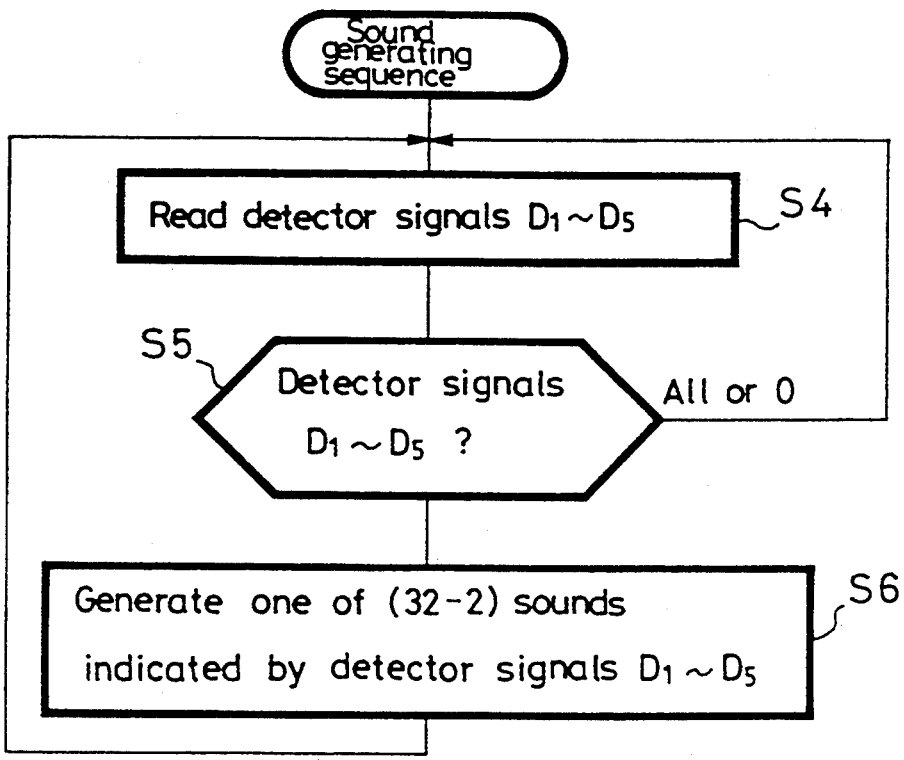
FIG. 8 is a flowchart of another operation sequence for detecting a tone plate with all-bit output signals from the detectors.

As shown in FIG. 8, the microcomputer 18 reads detected signals $D_1 \sim D_5$ from the respective detectors $12a \sim 12e$ in a step S4. Then, the microcomputer 18 determines whether there is a tone plate 2 in the recess 11 based on all the signals $D_1 \sim D_5$ from the respective detectors $12a \sim 12e$ in a step S5. Specifically, the identification code 21 is encoded such that all identification code bits which correspond to the detectors $12a \sim 12e$ are bright and dark stripes or dots, alternately or in other bit patterns. Therefore, if there is no tone plate placed in the recess 11 when the auditory playing device is used outdoors, then the signals $D_1 \sim D_5$ from the respective detectors $12a \sim 12e$ are "0, 0, 0, 0, 0". Conversely, if there is no tone plate placed in the recess 11 when the auditory playing device is used indoors, then the signals $D_1 \sim D_5$ from the respective detectors $12a \sim 12e$ are "1, 1, 1, 1, 1".

Therefore, if the signals $D_1 \sim D_5$ from the respective detectors $12a \sim 12e$ are "0, 0, 0, 0, 0" or "1, 1, 1, 1, 1" in the step S5, then the microcomputer 18 determines that no tone plate is placed in the recess 11, and control returns to the step S4.

If the signals $D_1 \sim D_5$ from the respective detectors $12a \sim 12e$ are of a bit pattern containing "0" and "1" in the step S5, then the microcomputer 18 determines that a tone plate 2 is placed in the recess 11. Thereafter, control proceeds to a step S6 in which the microcomputer 18 generates control data to produce one of 30 (32−2) sounds based on the signals $D_1 \sim D_5$ produced by the detectors $12a \sim 12e$.

Figures 9A, 9B:
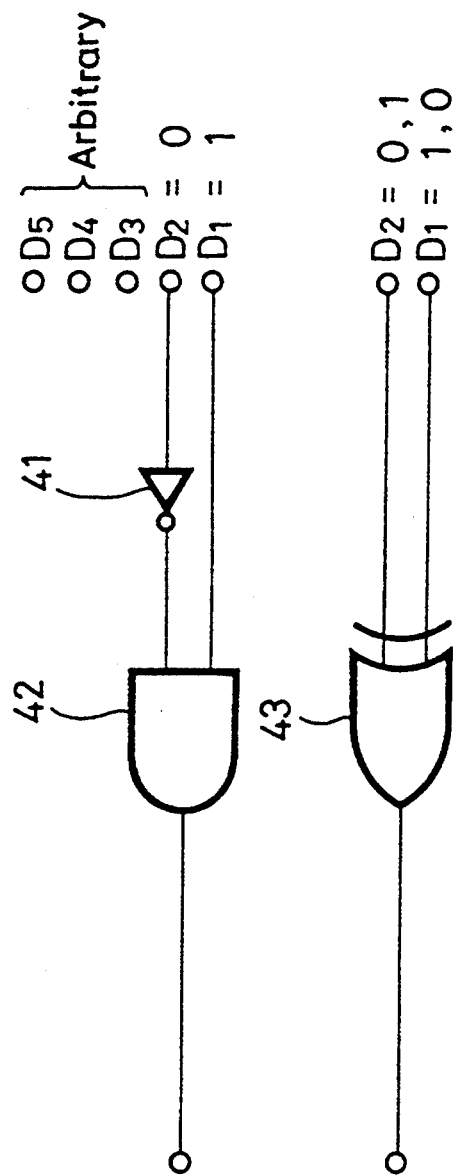
FIGS. 9A and 9B are block diagrams of different logic circuits for detecting a tone plate with 2-bit output signals from the detectors.
Figure 10:
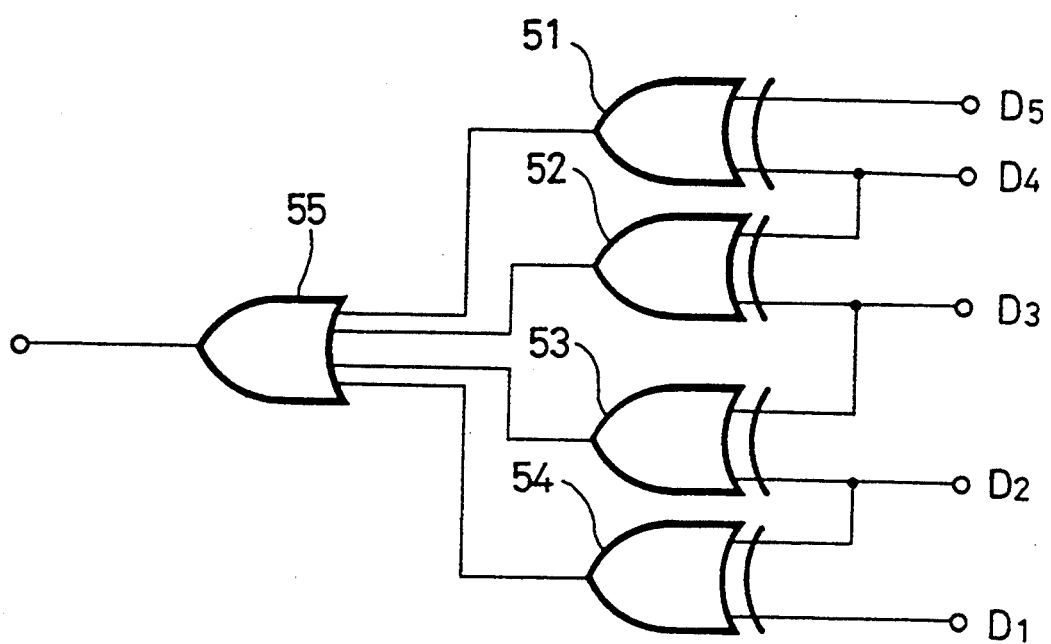
FIG. 10 is a block diagram of another logic circuit for detecting a tone plate with all-bit output signals from the detectors.
Figure 11E:
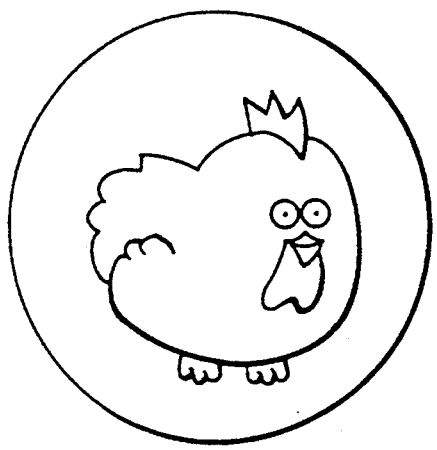
FIGS. 11E through 11H are views of other pictures that may be used on tone plates in an animal mode.
Figure 11F:
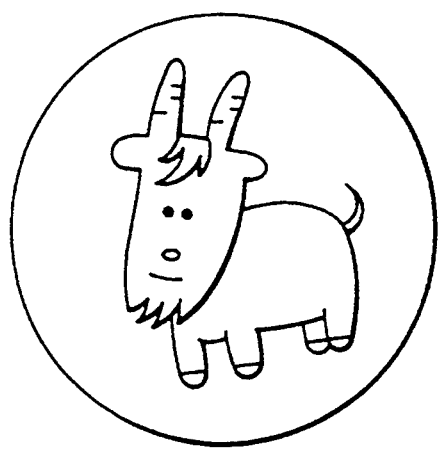
Figure 11G:
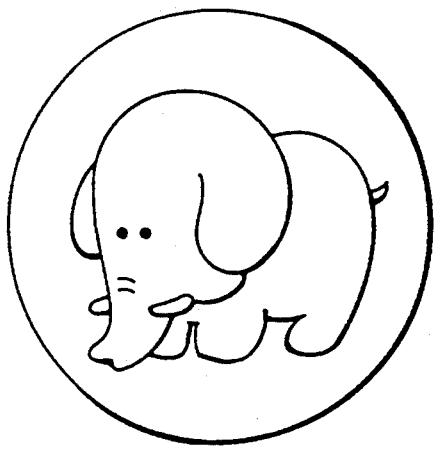
Figure 11H:
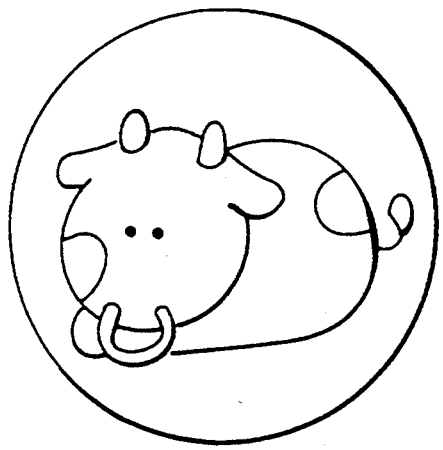
Figure 11I:
FIGS. 11I through 11L are views of pictures that may be used on tone plates in a music mode.
Figure 11J:
Figure 11K:
Figure 11L:
Figure 11M:
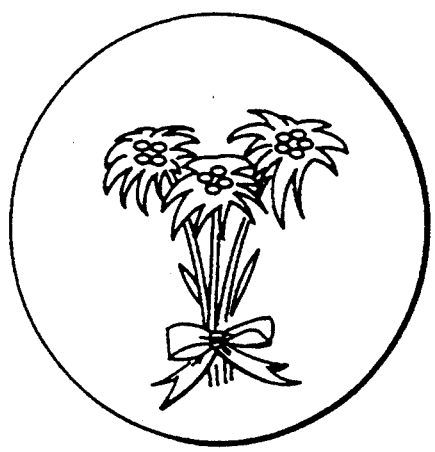
FIGS. 11M through 11P are views of other pictures that may be used on tone plates in a music mode.
Figure 11N:
Figure 11O:
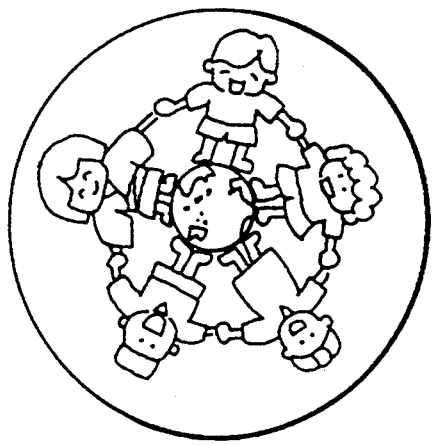
Figure 11P:
Figure 11Q:
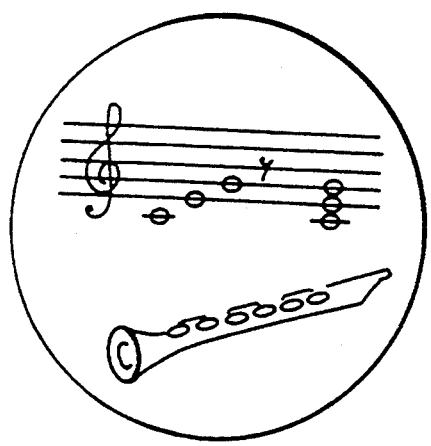
FIGS. 11Q through 11T are views of pictures that may be used on tone plates in a chord mode.
Figure 11R:
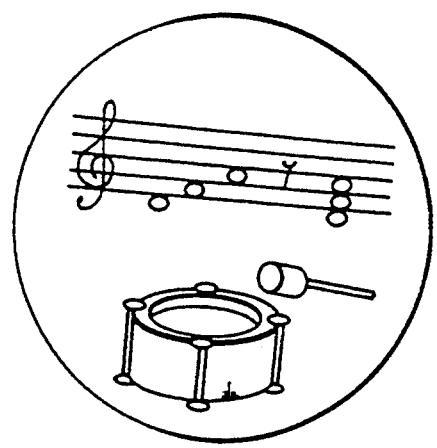
Figure 11S:
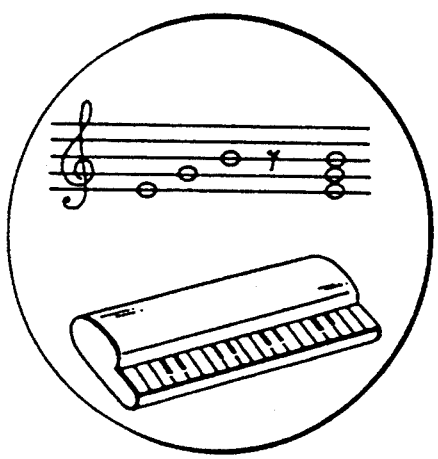
Figure 11T:
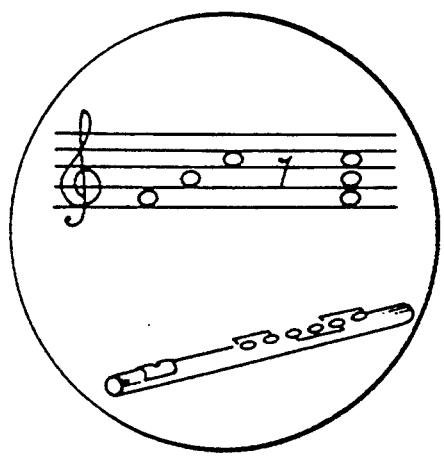
Figure 11U:
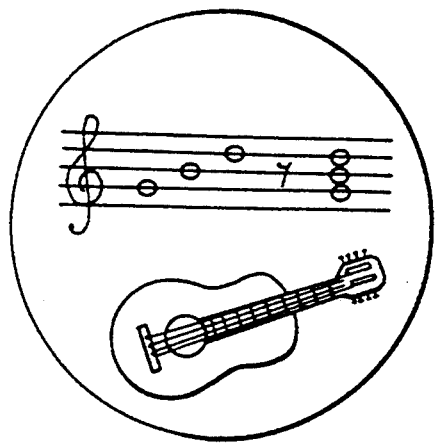
FIGS. 11U through 11X are views of other pictures that may be used on tone plates in a chord mode.
Figure 11V:
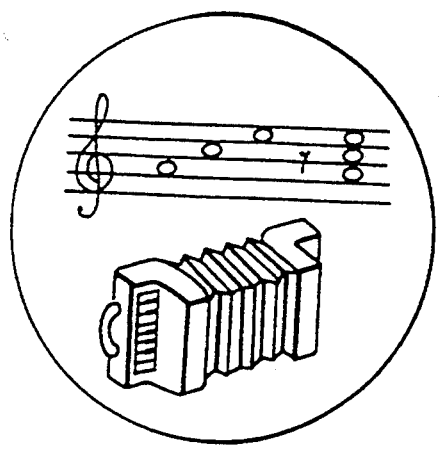
Figure 11W:
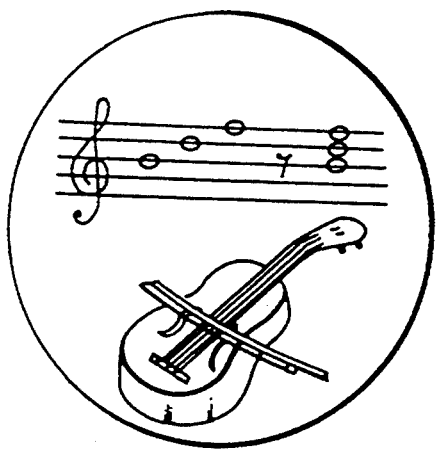
Figure 11X:
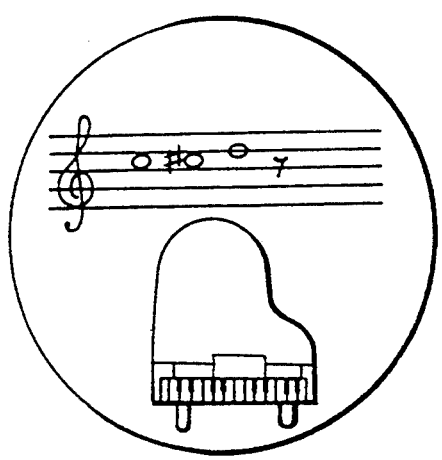
Figure 11Y:
FIGS. 11Y, 11Z and FIGS. 12a and 12b are views of pictures that can be used on tone plates in a sound mode.
Figure 11Z:
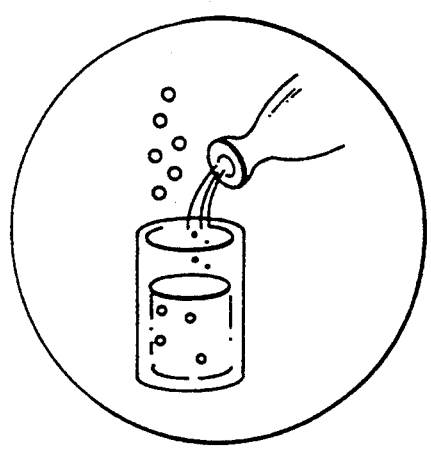
Figure 12A:
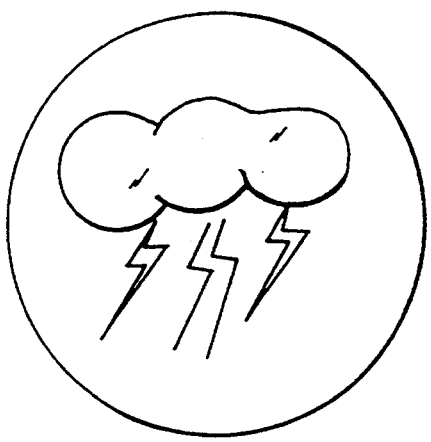
Figure 12B:
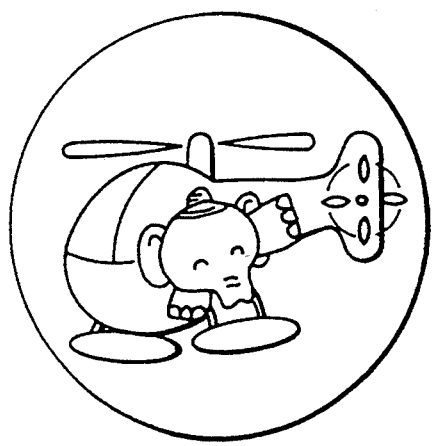
Figure 12C:
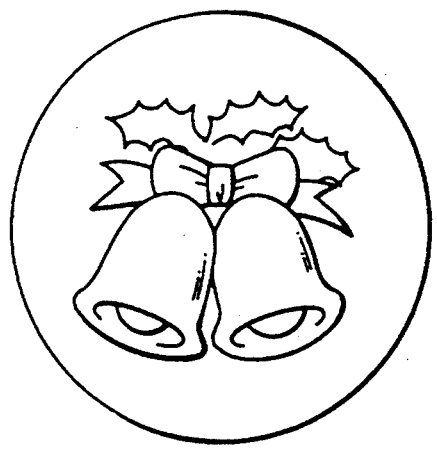
FIGS. 12c through 12f are views of other pictures that can be used on tone plates in a sound mode.
Figure 12D:
Figure 12E:
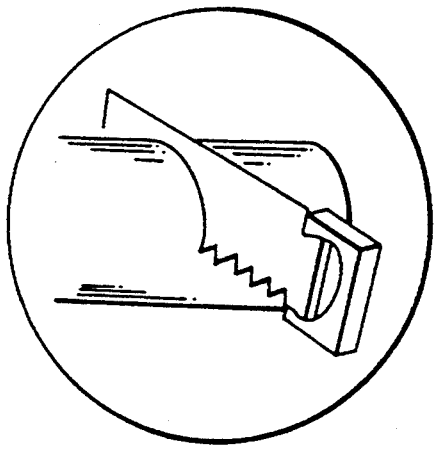
Figure 12F:
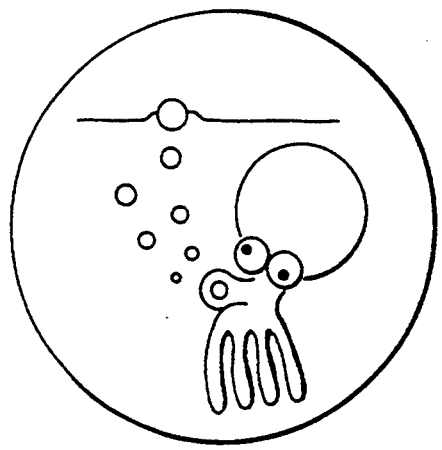
Figure 12G:
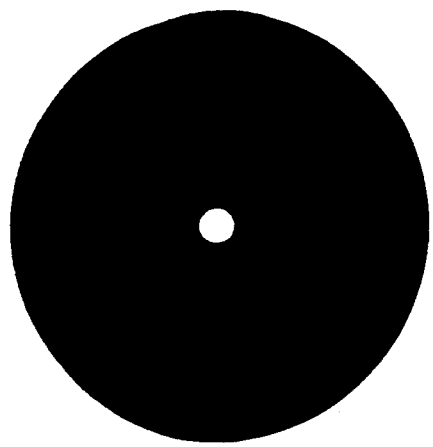
FIGS. 12g through 12j are views of identification codes corresponding to FIGS. 11A through 11D, respectively.
Figure 12H:
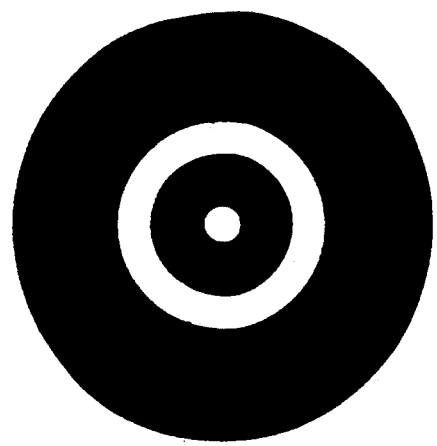
Figure 12I:
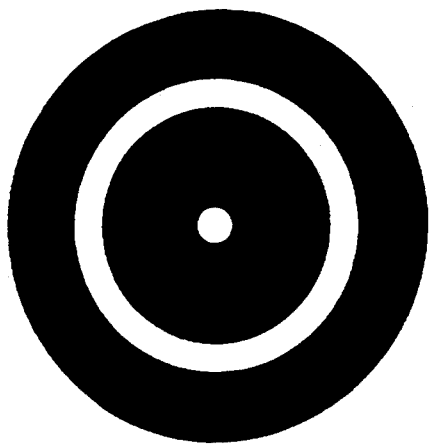
Figure 12J:
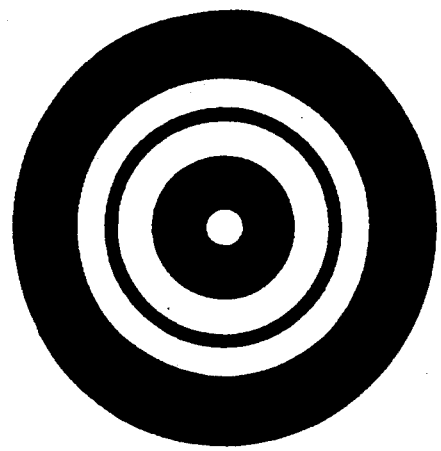
Figure 12K:
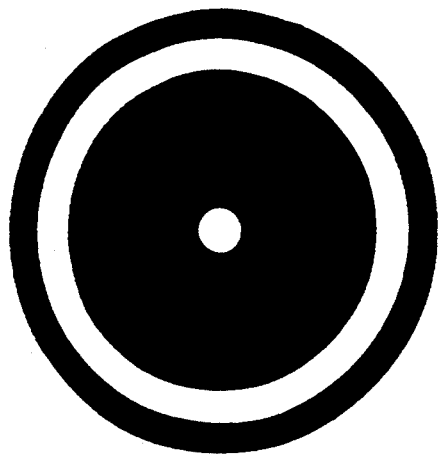
FIGS. 12k through 12n are views of identification codes corresponding to FIGS. 11E through 11H, respectively.
Figure 12L:
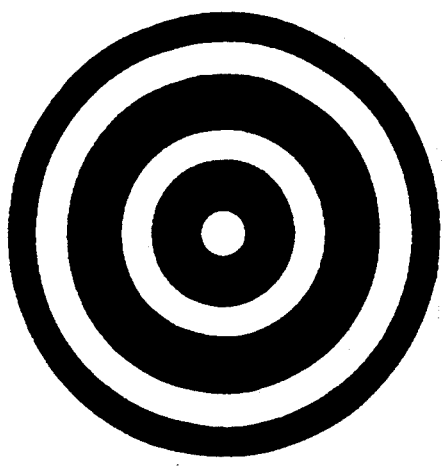
Figure 12M:
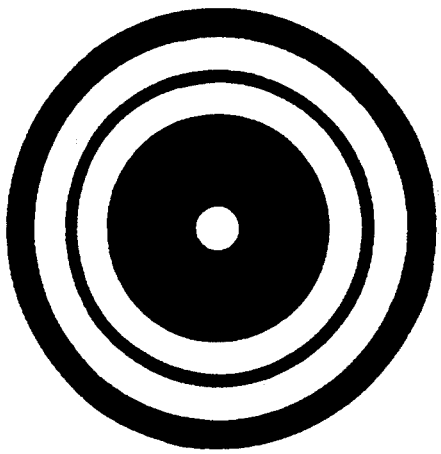
Figure 12N:
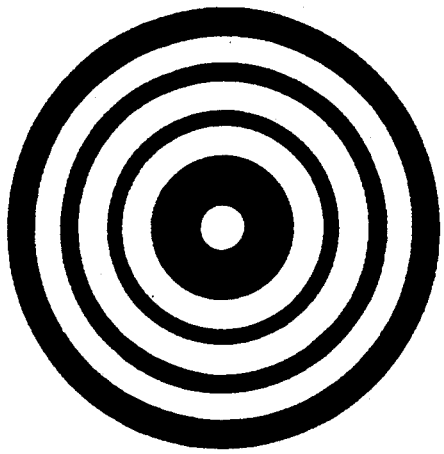

Whether there is a tone plate placed in the recess 11 or not may be determined using logic circuits based on some or all of the signals $D_1 \sim D_5$ from the detectors $12a \sim 12e$, as shown in FIGS. 9A, 9B, and 10.

FIG. 9A shows a logic circuit for detecting a tone plate with the signals $D_1$, $D_2$ from the detectors $12a$, $12b$. As shown in FIG. 9A, one of the signals $D_1$, $D_2$ from the detectors $12a$, $12b$, e.g., the signal $D_2$, is applied through an inverter 41 to an AND gate 42, and the other signal $D_1$ is applied directly to the AND gate 42. If the signal $D_1$ is "1" and the signal $D_2$ is "0", then the AND gate 42 produces an enable signal "1" at its output terminal, indicating that a tone plate 2 is placed in the recess 11.

FIG. 9B shows another logic circuit detecting a tone plate with the signals $D_1$, $D_2$ from the detectors $12a$, $12b$. As shown in FIG. 9B, the signals $D_1$, $D_2$ from the detectors $12a$, $12b$ are applied to an exclusive-OR gate 43. The exclusive-OR gate 43 produces an enable signal "1" at its output terminal, indicating that a tone plate 2 is placed in the recess 11, only if the signals $D_1$, $D_2$ are "0, 1" or "1, 0".

FIG. 10 shows still another logic circuit for detecting a tone plate with all the signals $D_1 \sim D_5$ from the detectors $12a \sim 12e$. As shown in FIG. 10, the signals $D_1$, $D_2$ from the detectors $12a$, $12b$ are applied to an exclusive-OR gate 54, the signals $D_2$, $D_3$ from the detectors $12b$, $12c$ are applied to an exclusive-OR gate 53, the signals $D_3$, $D_4$ from the detectors $12c$, $12d$ are applied to an exclusive-OR gate 52, and the signals $D_4$, $D_5$ from the detectors $12d$, $12e$ are applied to an exclusive-OR gate 51. The exclusive-OR gates 51, 52, 53, 54 apply their output signals to an OR gate 55. The OR gate 55 produces an enable signal "1" at its output terminal, indicating that a tone plate 2 is placed in the recess 11, if the signals $D_1 \sim D_5$ are of a bit pattern excluding "0, 0, 0, 0, 0" or "1, 1, 1, 1, 1".

The plural tone plates 2 may have on their face graphic patterns or pictures as shown in FIGS. 11A through 11Z and 12a through 12f. The tone plates 2 may also have on their back identification codes comprising concentric stripes or dots. For example, the tone plates 2 with the pictures shown in FIGS. 11A through 11D may have identification codes as shown in FIGS. 12g through 12j, respectively, and the tone plates 2 with the pictures shown in FIGS. 11E through 11H may have identification codes as shown in FIGS. 12k through 12n, respectively. Thus, the tone plates 2 have on their back certain respective identification codes and on their face pictures which call to mind sounds corresponding to the identification codes.

A plurality of groups of certain tone plates 2 are assigned to respective sound-source modes including an animal mode, a music mode, a chord mode, and a sound mode, and a plurality of groups of identification codes are given to these tone plates 2 in the groups, respectively. For example, the tone plates 2 with the pictures in an animal mode shown in FIGS. 11A through 11H are given respective identification codes shown in FIGS. 12g through 12n which correspond to the pictures in the animal mode. Sounds represented by the identification codes on those tone plates 2 shown in FIGS. 11A through 11H are cries of the animals indicated by the pictures on the tone plates 2. The tone plates 2 with the pictures in a music mode shown in FIGS. 11I through 11P are given respective identification codes which correspond to the pictures in the music mode. Sounds represented by the identification codes on those tone plates 2 shown in FIGS. 11I through 11P are music pieces that can be called to mind by the pictures on the tone plates 2. The tone plates 2 with the pictures in a chord mode shown in FIGS. 11Q through 11X are given respective identification codes which correspond to the pictures in the chord mode. Sounds represented by the identification codes on those tone plates 2 shown in FIGS. 11Q through 11X are chords that can be called to mind by the pictures on the tone plates 2. The tone plates 2 with the pictures in a sound mode shown in FIGS. 11Y, 11Z and 12a through 12f are given respective identification codes which correspond to the pictures in the sound mode. Sounds represented by the identification codes on those tone plates 2 shown in FIGS. 11Y, 11Z and 12a through 12f are familiar sounds that can be called to mind by the pictures on the tone plates 2.

Various other pictures such as of vehicles may be assigned to the tone plates 2, and identification codes representing sounds of such vehicles may be given to the tone plates.

The auditory playing device with a plurality of tone plates having a wide range of pictures and corresponding sounds may be used as an encyclopedia of sounds associated with pictures for educational purpose.

The auditory playing device with plural tone plates may also be used in various games.

For example, one game uses a plurality of pairs of tone plates with no pictures on their face. The tone plates of each pair have the same identification code on their back. These tone plates are scattered over an area with their faces up. When the game begins, the players take turns turning tone plates upside down to look for a matched pair of tone plates which produce the same sound on the auditory playing device.

According to another game, a set of tone plates with no pictures on their face and with respective identification codes on their face are successively placed on the auditory playing device by the dealer, so that the auditory playing device successively produces sounds corresponding to the identification codes. Having heard the produced sounds, the players try to get, as soon as possible, cards which bear pictures that call to mind the sounds that the players have just heard. In this game, the faces of the tone plates that are played back by the auditory playing device may be printed with those pictures which are shown in FIGS. 11A through 11Z and 12a through 12f, and when a tone plate is placed in the recess 11 on the casing 1, the players attempt to get a card with a picture corresponding to the sound produced by the auditory playing device. In the auditory playing device according to the illustrated embodiment, the tone plates have 5-bit identification codes ($2^5=32$), and when the auditory playing device successively plays back these identification codes with the detectors 12a~12e, the players try to get a total of 32 cards with pictures corresponding to the produced sounds. If the auditory playing device has four detectors, then the game uses tone plates with 4-bit identification codes ($2^4=16$).

In the latter game, the sounds represented by the identification codes on the tone plates may be reproduced by a device with a shuffle function similar to that which is found on a compact disc player. However, such a device with a software program is not suitable for use by general consumers particularly children as it is relatively expensive. Another problem is that the players must play the game at the rate of speed at which the device plays back the sounds. The auditory playing device according to the present invention is more advantageous in that it is relatively inexpensive, the rate at which the sounds are reproduced can be adjusted by the players, and the auditory playing device is educationally effective to train children.

The auditory playing device according to the present invention is useful in auditory education to train children for sharpened auditory senses through games. Since the tone plates may be circular or polygonal in shape, they can easily be handled by younger children. The auditory playing device is capable of accurately and reliably determining whether there is a tone plate actually placed on the device based on the signal from the detector device. Particularly, the auditory playing device is educationally effective for auditory training of children as it uses a combination of pictures and corresponding sounds which keep the children interested in the training process itself.

Having described preferred embodiments of the invention with reference to the accompanying drawings, it is to be understood that the invention is not limited to that precise embodiments and that various changes and modifications could be effected by one skilled in the art without departing from the spirit or scope of the invention as defined in the appended claims.

What is claimed is:

1. An auditory playing device comprising:
    a tone plate marked with a concentric identification code corresponding to a sound, said identification code comprising concentric dark and bright regions;
    a recess in which said tone plate is placed in a stationary position;
    detecting means disposed in said recess for detecting the identification code of said tone plate while said tone plate is in said stationary position in said recess, said detecting means detecting said identification code regardless of the orientation of said tone plate when the tone plate is in said recess; and
    generating means for generating the sound corresponding to the identification code detected by said detecting means.

2. An auditory playing device according to claim 1, wherein said tone plate is of a circular shape with the identification code thereof being arranged from the center of said tone plate to the outer circumferential edge thereof, each of said regions corresponding to one bit of said identification code.

3. An auditory playing device according to claim 1, wherein said tone plate is of a polygonal shape with the identification code thereof being arranged symmetrically from the center of said plate with respect to all sides thereof, said regions being positioned on said tone plate to be disposed in proximity to corresponding elements of said detecting means regardless of the orientation of said tone plate when placed in said recess.

4. An auditory playing device according to claim 1, wherein said recess has an area facing said tone plate placed therein, said area being smaller than the tone plate so that when the tone plate is placed in said recess, a marginal edge of the tone plate projects out of said recess.

5. An auditory playing device according to claim 1, wherein said tone plate is one of a plurality of tone plates each having an unique identification code.

6. An auditory playing device according to claim 5, wherein said concentric identification codes are attached to backs of said tone plates, respectively, said tone plates being marked on faces thereof with respective pictures corresponding to said concentric identification codes, respectively.

7. An auditory playing device according to claim 1, wherein said detecting means includes a plurality of photodetectors each of which detects a different portion of said identification code and outputs a corresponding logic signal indicative thereof to said generating means.

8. An auditory playing device comprising:
a tone plate marked with an identification code corresponding to a sound, said identification code comprising concentric dark and bright stripes;
a recess in which said tone plate is placed in a stationary position, said tone plate being placed substantially in any orientation with respect to said recess;
optical detecting means disposed in said recess for optically detecting the identification code of said tone plate while said tone plate is in said stationary position; and
generating means for generating the sound corresponding to the identification code detected by said optical detecting means.

9. An auditory playing device comprising:
a tone plate marked with an identification code corresponding to a sound, said identification code comprising concentric dark and bright stripes;
means for defining a recess for placing said tone plate therein substantially in any orientation with respect thereto;
optical detecting means disposed in said recess for optically detecting the identification code of said tone plate while said tone plate is in said stationary position; and
generating means for generating the sound corresponding to the identification code detected by said optical detecting means;
wherein said optical detecting means comprises an array of reflective detectors arranged across the identification code of the tone plate placed in said recess, each of said reflective detectors comprising a light-emitting device for applying light to the identification code and a photodetector for detecting light reflected by the identification code.

10. An auditory playing device comprising:
a tone plate marked with an identification code corresponding to a sound, said identification code comprising concentric dark and bright stripes each corresponding to a bit of said identification code;
means for defining a recess for placing said tone plate therein substantially in any orientation with respect thereto;
optical detecting means disposed in said recess for optically detecting the identification code of said tone plate while said tone plate is in said stationary position;
generating means for generating the sound corresponding to the identification code detected by said optical detecting means; and
control means for determining whether the tone plate is placed in said recess based on at least some of the bits of the identification code detected by said optical detecting means, and energizing said generating means when the tone plate is determined as being placed in said recess.

11. An auditory playing device according to claim 10, wherein said control means comprises means for determining that the tone plate is not placed in said recess when at least two of the bits of the identification code detected by said optical detecting means are of a pattern depending on extraneous light applied to the identification code.

12. An auditory playing device according to claim 10, wherein said control means comprises means for determining that the tone plate is not placed in said recess when all of the bits of the identification code detected by said optical detecting means are of a pattern depending on extraneous light applied to the identification code.

13. An auditory system comprising:
a unit having a recess formed therein;
a plurality of tone disks having a shape adapted to fit at least partially within said recess, each disk having an identification code provided on a face thereof, said identification code consisting of a plurality of concentric solid light or dark bands extending from a center of each disk, each band corresponding to one bit of said identification code;
a plurality of photodetectors provided in said recess, each photodetector being provided proximate to a corresponding one of said solid bands when one of said plurality of tone disks is within said recess whereby each photodetector outputs a logic signal indicative of whether the corresponding band is light or dark regardless of the angular orientation of the tone disk within said recess; and
a processor provided in said unit which receives the logic signals output from said plurality of photodetectors and provides signals in response thereto which initiate prerecorded sound corresponding to said identification code to be played by a speaker operatively coupled to the processor.

14. The auditory system of claim 13 further comprising a mode selecting switch provided on said unit, said mode selecting switch providing a mode signal to said processor indicating a type of sound to be played in response to said identification code.

15. The auditory system of claim 13 wherein at least two bands of said identification code provide at least two bits indicative of the presence of the tone disk within said recess.

16. The auditory system of claim 13 wherein said prerecorded sound is encoded in memory as digital audio data, said digital audio data being accessed by said processor in response to an identification code provided from said photodetectors.

17. The auditory system of claim 13 wherein each said tone disk is provided with a picture on a second face, said picture visually indicating the sound produced in response to the disk being placed within said recess.

* * * * *